Figure 1:
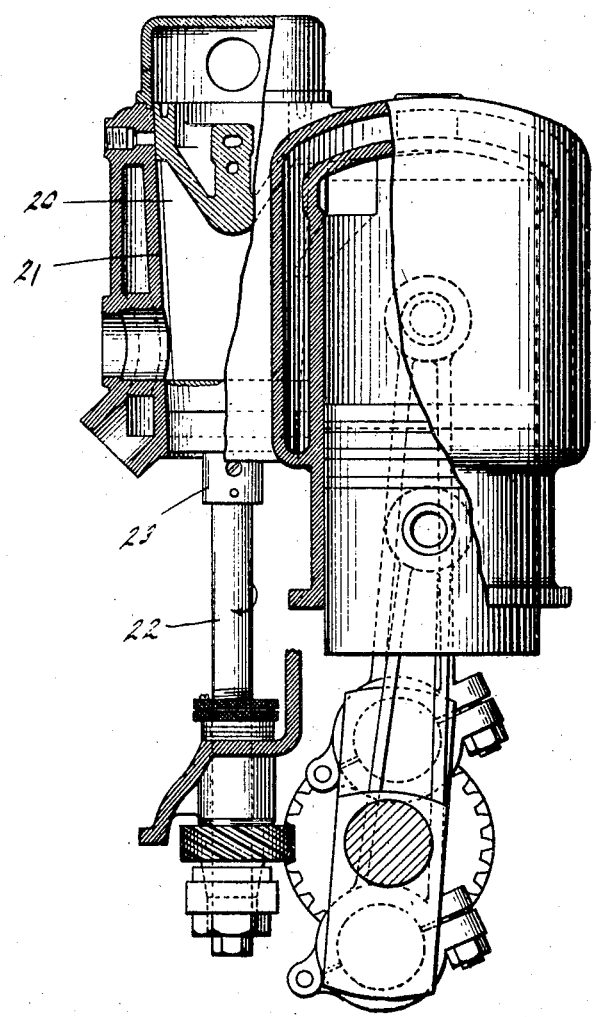

E. L. RUSSELL.
VALVE ACTUATING AND ADJUSTING MECHANISM.
APPLICATION FILED JAN. 20, 1911. RENEWED FEB. 8, 1915.

1,153,707.

Patented Sept. 14, 1915.
4 SHEETS—SHEET 1.

Witnesses
Frank A. Sable
Thomas H. McManus

Inventor
Edwin L. Russell
By Bradford Hood
Attorneys

E. L. RUSSELL.
VALVE ACTUATING AND ADJUSTING MECHANISM.
APPLICATION FILED JAN. 20, 1911. RENEWED FEB. 8, 1915.
1,153,707.
Patented Sept. 14, 1915.
4 SHEETS—SHEET 2.
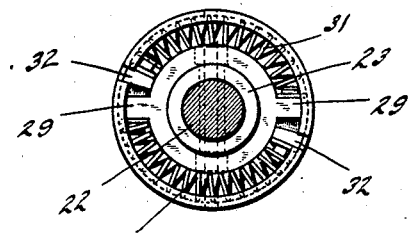
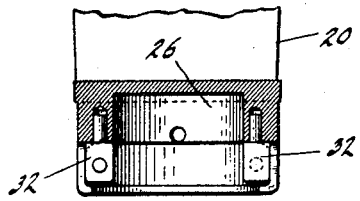
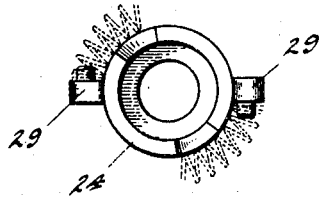
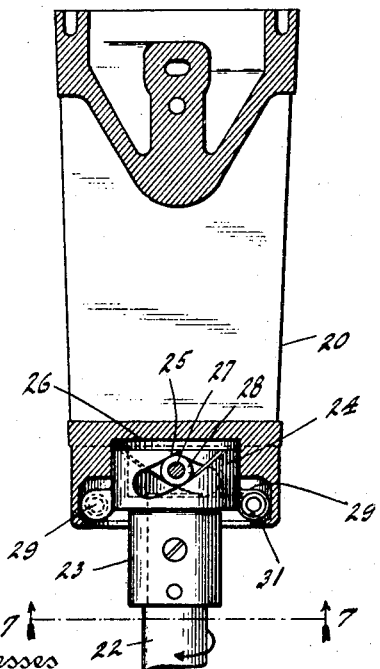
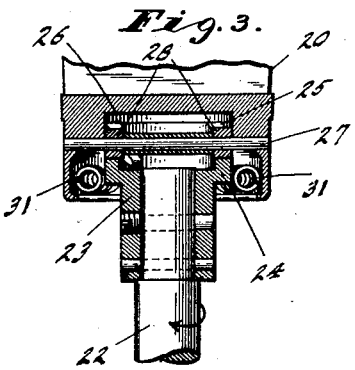
Inventor
Edwin L. Russell,

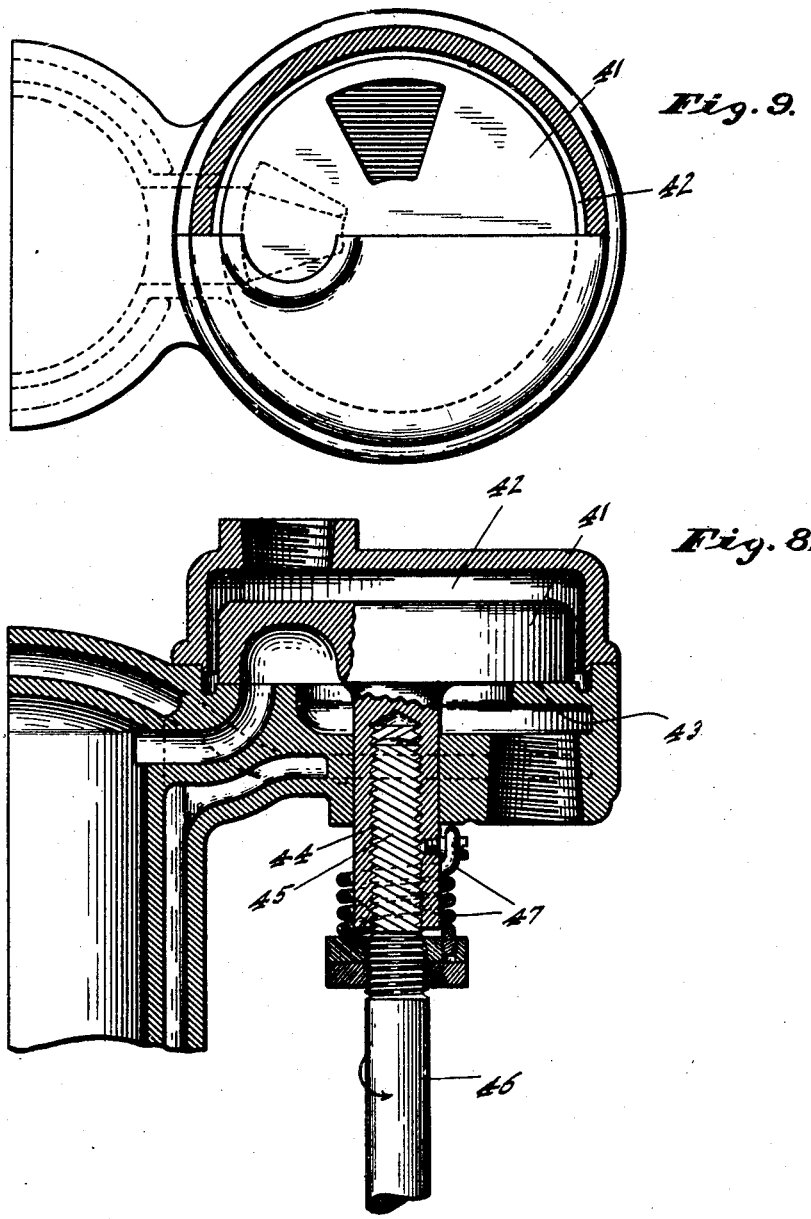

E. L. RUSSELL.
VALVE ACTUATING AND ADJUSTING MECHANISM.
APPLICATION FILED JAN. 20, 1911. RENEWED FEB. 8, 1915.
1,153,707.
Patented Sept. 14, 1915.
4 SHEETS—SHEET 4.
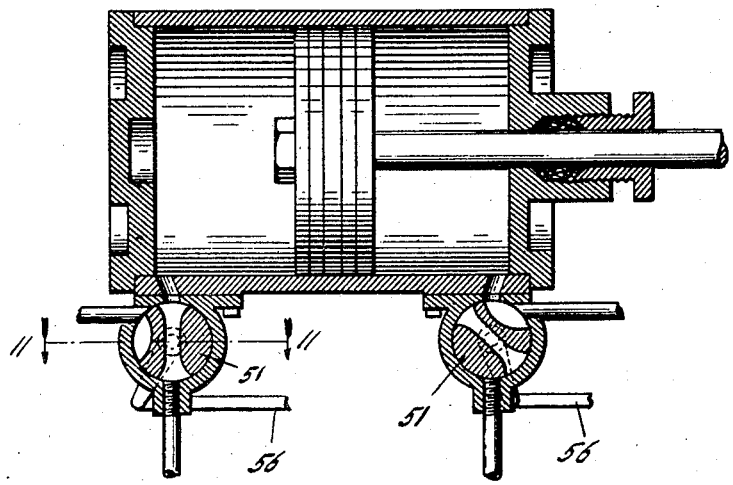
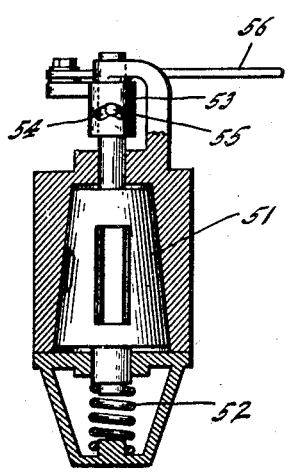
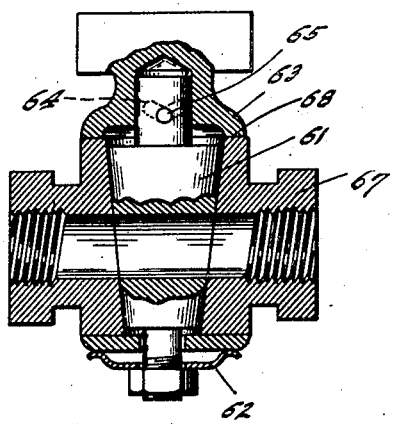

UNITED STATES PATENT OFFICE.

EDWIN L. RUSSELL, OF CLEVELAND OHIO, ASSIGNOR TO EDWARD W. ANSTED, OF CONNELLSVILLE, INDIANA.

VALVE ACTUATING AND ADJUSTING MECHANISM.

1,153,707. Specification of Letters Patent. Patented Sept. 14, 1915.

Application filed January 20, 1911, Serial No. 603,705. Renewed February 8, 1915. Serial No. 6,802.

*To all whom it may concern:*

Be it known that I, EDWIN L. RUSSELL, a citizen of the United States, residing at Cleveland, in the county of Cuyahoga and State of Ohio, have invented a new and useful Valve Actuating and Adjusting Mechanism, of which the following is a specification.

In the operation of a valve, or other member seated upon or in a stationary member, it is not unusual for the movable member to stick upon or in its seat and thus resist movement. Such a condition is often found in valves which are subjected to heat, high pressure, corrosion, etc., and is more especially found in valves of the plug or tapered type which are subjected to wide variations of temperature. In gas engine practice, many attempts have been made to provide a rotary valve for controlling the movements of the fuel and spent gases but such valves, if of more than an inch or so in diameter have proved to be uncommercial because of the impossibility, heretofore, of so constructing the valve that, if it be tight when cold, it will not stick when hot and expanded.

The object of my present invention is, therefore, to produce a structure comprising a seat member, a seated member yieldingly urged to its seat, and a driving member so connected with the seated member that the initial movement of the driving member will act in opposition to the seating force (which may be a spring or weight or the weight of the seated member itself, etc.,) operating on the seated member and thereafter will serve to drive said seated member from one position to another upon its seat.

More specifically, the object of my invention is to produce a valve structure in which the movable blocking (or seated) member is yieldingly urged to its seat and said seated member is operated upon by a driving member so connected therewith that, if movement of the seated member from one position to another on its seat be abnormally resisted, frictionally or otherwise, the effect of the initial movement of the driving member will be to reduce such resistance and then to shift the seated member on its seat.

It has been well known, heretofore, that rotary valves are especially adapted for use in engine practice and that a comparatively large valve is better than a small valve but a valve of the ordinary tapered or plug type, while it is easy to initially fit, will, when of reasonable size, expand so much under heat as to stick in its seat to such an extent as to resist movement and, if the valve be made loose enough to allow for this expansion, it will be so far from a fit when cold that the engine cannot be started.

The accompanying drawings illustrate my invention as applied to valve constructions of several types.

Figure 1 is a vertical section of an internal combustion engine equipped with my improved valve actuating mechanism; Fig. 2 an enlarged axial section of the connection between the valve member and the driving member, the driving member being shown in full lines; Fig. 3 a similar section of a portion of the parts shown in Fig. 2 with the driving member shown in an axial section; Fig. 4 an elevation of the driving member; Fig. 5 a plan of the parts shown in Fig. 4; Fig. 6 a fragmentary section of that portion of the valve or seated member to which the driving member is connected; Fig. 7 a section on line 7—7 of Fig. 2 looking in the direction indicated by the arrows; Fig. 8 an axial section of a plate or disk valve equipped with my improved driving connection; Fig. 9 a plan of the parts shown in Fig. 8; Fig. 10 a diagram of a steam cylinder equipped with reciprocating plug valves constructed in accordance with my invention; Fig. 11 a section on line 11—11 of Fig. 10, and Fig. 12 an axial section of an ordinary plug valve constructed in accordance with my invention.

In Figs. 1 to 7, inclusive, 20 indicates the seated member of the valve, 21 the seat member of the valve, and 22 a shaft rotating in one direction and forming a part of the train by means of which the seated member 20 is to be moved on its seat. Secured to the end of shaft 22 is a driving member 23 provided with an annular axially extending flange 24 having two opposed axially extending cam slots (or screw threaded portions) 25. The seated member 20 of the valve is provided with a pocket 26 adapted to receive flange 24 and extending across this pocket is a bar 27 upon which are journaled two rollers 28, 28 adapted to be received in the cam slots 25. The driving member 23 is provided with a pair of opposite radially extending ears 29, 29 which form abutments for two compression springs 31, 31 which, at their opposite ends, abut against plugs 32, 32 mounted in the outer end of pocket 26. When the shaft 22 is at rest, springs 31 are under compression and tend to rotate the seated member 20 to drive the rollers 28 farther into the cam slots 25 so as to thus force the seated member to its seat with a yielding force. The same result might, of course, be obtained without the springs if the seated member had sufficient weight of itself or had a weight or some other form of spring applied to it.

In operation the force applied to rotate shaft 22 will, in its application to the seated member 20, be divided into two components by the cam slots 25 and rollers 28, one serving to lift the seated member from its seat and the other operating through springs 31 to drive the seated member within its seat. If, therefore, the resistance to movement of the seated member be greater than normal, the initial movement of the driving member will operate to raise the seated member from its seat, thus reducing resistance to movement but only reducing that resistance to a point where the springs 31 and the interaction of roller 28 and slot 25 are capable of producing the shifting movement. It will be seen therefore that the driving member serves at all times to first establish a proper running condition of the seated member and thereafter to produce the desired shifting movement of that member and that this operation is entirely automatic.

In Figs. 8 and 9 I have shown a disk or plate valve 41 which lies in a chamber 42 in which a pressure may be maintained which, operating upon the disk 41 will serve to drive it to its seat 43. The stem of the valve disk 41 is provided with axial threads 44, preferably of a quick pitch and threaded freely into these threads 44 are threads 45 on a driving shaft 46. This shaft is held against axial movement in any desirable manner, such, for instance, as is shown in Fig. 1, and a coil spring 47 is connected at one end to shaft 46 and at the other end to the stem of disk 41, said spring being placed under tension so as to normally act upon the disk in such manner as to rotate it upon threads 45 in a direction tending to seat the disk upon its seat. Upon rotation of shaft 46 in the direction indicated by the arrows, the initial tendency will be to rotate this shaft relative to the disk (if there be too great a resistance to movement of the risk) until the resistance to shifting movement of the disk be no greater than the angular driving power of spring 47 and the friction between the threads, whereupon the disk will be shifted on its seat by the shaft.

In Figs. 10 and 11, the plug valve 51, of any ordinary form, is yieldingly axially urged to its seat by a spring 52. A driving member 53, in the form of a sleeve held against axial movement, is provided with a pair of V-shaped slots 54 (only one being shown) into which project pins 55 carried by the stem of valve 51. When the valve 51 is seated the normal position of each pin 55 will be in the crotch of the V of its slot 54. If now the driving member 53 be oscillated in either direction from its normal position and there be a resistance to turning of the valve 51 greater than the tangential component of the force delivered to the valve through the medium of the pin and slot connection, the axial component of that force will initially serve to drive the valve axially against the action of spring 52 until it is sufficiently relieved from its seat to permit angular movement. This action takes place upon movement of the driving link 56 in either direction.

In Fig. 12 the structure is practically identical with that shown in Fig. 11 excepting only that the structure is designed for hand operation. Here the plug valve 61 is normally urged into its seat by a spring 62. The driving member 63 is provided with opposite V-shaped slots 64 which receive pins 65 projecting from the stem of the valve. The axial movement of the driving member 63 is resisted by the engagement of said member with the upper end of the valve casing 67 at 68.

The many uses to which this invention may be put will readily suggest themselves to skilled mechanics and shall not attempt to point out specifically all such uses. I desire to call attention especially, however, to the peculiar value which the invention has as applied to a tapered rotary or oscillating valve where variations of fit of comparatively small amounts due to wear, temperature changes, etc., serve to very materially affect the efficiency of the valve. By my construction, a valve may be closely fitted when cool and this valve will then run in the same relation to its casing wholly irrespective of its temperature or wear because, when the valve is at rest, it is yieldingly drawn to its seat with a given force. If thereafter there be an expansion tending to increase the diameter and thus tending to stick the valve in its casing, attempt to rotate the valve by means of my peculiar driving connection, operates immediately, and before any rotation of the valve, in an axial lifting of the valve away from its casing, and this lifting effect is only carried to an extent which is just sufficient to bring the valve into a new relationship with its casing under a seating force which permits free actuation. It will also be seen that when the valve and its casing cool, the valve will be automatically returned to its initial adjustment. It will also be seen that, in the operation of a valve of this type, there will be repeated changes of axial position of the valve in its casing so that there can be no tendency to cut either the valve or the casing in circular lines, any particular point of the valve traversing its casing in a variable line of travel due to the composite movement of the valve.

I claim as my invention:

1. The combination of a seat member, a seated member seated thereon and capable of movement along the seat member and movement toward and from the seat member, a driving member, a direct but yielding driving connection between the driving member and seated member tending continuously to drive the seated member along the seat member, and interengaging parts carried by the seated member and driving member whereby, upon movement of the driving member, resistance to movement of the seated member along its seat in excess of the normal strength of the yielding driving connection will cause initial movement of the seated member away from its seat, and movement of the seated member along its seat independent of the driving member under the influence of the yielding driving connection will drive the seated member toward its seat.

2. The combination of a seat member, a rotatable seated member associated therewith, a driving member, a torque-applying spring connecting the seated member and driving member, and interengaging members carried by the driving member and the seated member and interacting under normal stress of the spring, to drive the seated member toward the seat member and, under resistance of the seated member to rotative movement by the driving member, to drive the seated member away from its seat.

3. The combination of an axially tapered seat member, an axially tapered rotatable seated member associated therewith, a driving member, a torque-applying spring connecting the seated member and driving member, and interengaging members carried by the driving member and the seated member and interacting, under normal stress of the spring, to drive the seated member toward the seat member and, under resistance of the seated member to rotative movement by the driving member, to drive the seated member away from its seat.

4. The combination of a seat member, a seated member yieldingly seated thereon and movable thereon from one position to another, a driving member, a spring driving connection between the driving member and seated member, and an unseating connection between the driving member and seated member.

5. The combination of a seat member, a seated member yieldingly seated thereon and movable thereon from one position to another, a driving member, a spring driving connection between the driving member and seated member, and a cam connection between the driving member and seated member comprising two interacting portions relative movement of which tends to unseat the seated member.

6. The combination of a tapered seat member, a rotary tapered seated member co-acting therewith, a rotary driving member to shift the seated member from one position to another on the seat member, a cam-connection between the driving member and seated member capable of producing axial unseating movement of the seated member, and a spring shifting connection between the driving member and seated member, said spring acting normally to yieldingly seat the seated member.

7. The combination of a tapered seat member, a rotary tapered seated member co-acting therewith, a rotary driving member to shift the seated member from one position to another on the seat member, a cam-connection between the driving member and seated member capable of producing axial unseating movement of the seated member, and a spring shifting connection between the driving member and seated member.

8. The combination of a seat member, a rotary seated member co-acting therewith, a rotary driving member to shift the seated member from one position to another on the seat member, a cam-connection between the driving member and seated member capable of producing unseating movement of the seated member, and a spring shifting connection between the driving member and seated member, said spring acting normally to yieldingly seat the seated member.

9. The combination of a seat member, a rotary seated member co-acting therewith, a rotary driving member to shift the seated member from one position to another on the seat member, a cam-connection between the driving member and seated member capable of producing unseating movement of the seated member, and a spring shifting connection between the driving member and seated member.

10. The combination of a tapered seat member, a tapered rotary seated member axially yieldable relative to the seat member, a rotary driving member, an axially yielding screw connection between the driving member and seated member, and a spring connection between the driving member and seated member tending to yieldingly urge the seated member to its seat.

11. The combination of a seat member, a rotary seated member axially yieldable relative to the seat member, a rotary driving member, an axially yielding screw connection between the driving member and seated member, and a spring connection between the driving member and seated member tending to normally rotate the seated member relative to the driving member to yieldingly urge the seated member to its seat.

12. The combination of a seat member and a seated member, one journaled in the other, of a driving member for angularly shifting the journaled member, a connection between the movable one of said two members and the driving member for directly and yieldingly applying torque to the said movable member, and connections between one of said members and the driving member for relatively adjusting the seat member and seated member to reduce resistance to angular movement of the journaled member upon initial relative movement of the driving member.

13. The combination of a seat member and a seated member, one sleeved over the other and one of said members movable relative to the other, of a driver member for shifting the movable member, a connection between the movable one of said two members and the driver member for yieldingly applying torque to the said movable member, and coacting means connected with the driving member and one of the two first mentioned members for preliminarily adjusting the fit of said two members upon initial relative movement of the driver and prior to the desired relative movement of the said two members.

14. The combination of a seat member, a rotatable seated member associated therewith, a driving member, a rotatable screw-connection between the seated member and the driving member preventing movement of the seated member away from the seat member except by rotation of the driving member, and means for normally yieldingly holding the seated member to its seat.

15. The combination of a seat member, a rotatable seated member associated therewith, a driving member, and a rotatable screw-connection between the seated member and the driving member preventing movement of the seated member away from the seat member except by rotation of the driving member.

16. The combination of an axially tapered seat member, a rotatable axially tapered seated member associated with the seat member, a driving member, a rotatable screw connection between the seated member and the driving member preventing axial movement of the seated member relative to the seat member except by rotation of the driving member, and means for normally yieldingly holding the seated member to its seat.

17. The combination of an axially tapered seat member, a rotatable axially tapered seated member associated with the seat member, a driving member, and a rotatable screw connection between the seated member and the driving member preventing axial movement of the seated member relative to the seat member except by rotation of the driving member.

18. The combination with a valve seat, a longitudinally tapering rotary valve, and a driver therefor, of a resilient connection between the driver and valve, said connection comprising oblique slots and means coöperating with said slots whereby upon a predetermined rotary resistance said valve will be automatically moved in a longitudinal direction.

19. The combination of an axially tapered seat member, a rotatable axially tapered seated member associated with the seat member, a driver, a relatively rotatable double acting helical connection between the driver and the seated member producing movement of the seated member toward or from the seat member upon relative rotation between the driver and seated member, and a spring interposed between the driver and seated member operating, when under flexure due to relative rotation between the driver and seated member, to increase the rotative driving effect upon the seated member and produce increased tendency in the seated member to move both rotatably and axially relative to the driver.

20. The combination of a seat member, a rotatable seated member associated with the seat member, a driver, a relatively rotatable double acting helical connection between the driver and the seated member producing movement of the seated member toward or from the seat member upon relative rotation between the driver and seated member, and a spring interposed between the driver and seated member operating, when under flexure due to relative rotation between the driver and seated member, to increase the rotative driving effect upon the seated member and produce increased tendency in the seated member to move both rotatably and axially relative to the driver.

21. The combination of an axially tapered seat member, a rotatable axially tapered seated member associated with the seat member, a driver, a relatively rotatable connection between the driver and the seated member producing movement of the seated member toward or from the seat member upon relative rotation between the driver and seated member, and a spring interposed between the driver and seated member operating, when under flexure due to relative rotation between the driver and seated member, to increase the rotative driving effect upon the seated member.

22. The combination of a seat member, a rotatable seated member associated with the seat member, a driver, a relatively rotatable connection between the driver and the seated member producing movement of the seated member toward or from the seat member upon relative rotation between the driver and seated member, and a spring interposed between the driver and seated member operating, when under flexure due to relative rotation between the driver and seated member, to increase the rotative driving effect upon the seated member.

In witness whereof, I, have hereunto set my hand and seal at Indianapolis, Indiana, this 10th day of January, A. D. one thousand nine hundred and eleven.

EDWIN L. RUSSELL. [L. S.]

Witnesses:
 ARTHUR M. HOOD,
 THOMAS W. MCMEANS.